United States Patent
Agnevik et al.

(10) Patent No.: US 7,230,948 B2
(45) Date of Patent: Jun. 12, 2007

(54) BANDWIDTH EFFICIENT QUALITY OF SERVICE SEPARATION OF AAL2 TRAFFIC

(75) Inventors: Mikael Agnevik, Gustavsberg (SE); Per Wollbrand, Stockholm (SE); Bo Karlander, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1044 days.

(21) Appl. No.: 09/870,945

(22) Filed: Jun. 1, 2001

(65) Prior Publication Data

US 2002/0181470 A1   Dec. 5, 2002

(51) Int. Cl.
*H04L 12/28* (2006.01)

(52) U.S. Cl. ............... 370/395; 370/395.1; 370/395.6; 370/468

(58) Field of Classification Search ............ 370/395.6, 370/395.2, 395.4, 395.41, 395.42, 395.43, 370/395.1, 399, 468
See application file for complete search history.

(56) References Cited

U.S. PATENT DOCUMENTS

| | | | |
|---|---|---|---|
| 5,442,625 A | | 8/1995 | Gitlin et al. |
| 5,467,348 A | * | 11/1995 | Fujii et al. .................. 370/468 |
| 5,583,869 A | | 12/1996 | Grube et al. |
| 5,625,877 A | | 4/1997 | Dunn et al. |
| 5,745,480 A | | 4/1998 | Behtash et al. |
| 6,097,722 A | * | 8/2000 | Graham et al. ........ 370/395.21 |
| 6,259,699 B1 | * | 7/2001 | Opalka et al. .............. 370/398 |
| 6,314,103 B1 | * | 11/2001 | Medhat et al. ........... 370/395.2 |
| 6,483,838 B1 | * | 11/2002 | Ostman et al. ......... 370/395.31 |
| 6,574,222 B1 | * | 6/2003 | Medhat et al. ........... 370/395.1 |
| 6,594,267 B1 | * | 7/2003 | Dempo .................. 370/395.64 |
| 6,725,038 B1 | * | 4/2004 | Subbiah ....................... 455/436 |

(Continued)

FOREIGN PATENT DOCUMENTS

| | | |
|---|---|---|
| EP | 0 915 634 A2 | 5/1999 |
| WO | 95/30317 A | 11/1995 |
| WO | 97/37503 A | 10/1997 |
| WO | 98/27692 A1 | 6/1998 |
| WO | 99/00971 A | 1/1999 |

OTHER PUBLICATIONS

International Preliminary Examination Report mailed Sep. 1, 2003 in corresponding PCT Application No. PCT/SE02/01052.

(Continued)

*Primary Examiner*—Wing Chan
*Assistant Examiner*—Andrew C. Lee
(74) *Attorney, Agent, or Firm*—Nixon & Vanderhye P.C.

(57) ABSTRACT

An AAL2 path group (60) comprises plural AAL2 paths (35). Bandwidth of an individual AAL2 path comprising the AAL2 path group is contributed to a total bandwidth of the AAL2 path group rather than to the individual AAL2 path exclusively. An admission decision regarding a connection seeking to use an AAL2 path belonging to the AAL2 path group is based on available bandwidth of the AAL2 path group rather than available bandwidth of an individual AAL2 path. ATM VCCs which comprise the AAL2 path group are transported on a virtual path (VP) together with ATM VCCs of a different type (e.g., a second type which differs from a first type of ATM VCC which comprise the AAL2 path group). The AAL2 path group also features quality of service (QoS) separation, e.g., differing treatment for differing AAL2 connections within the AAL2 path group based on the QoS requirements for the differing AAL2 connections.

46 Claims, 8 Drawing Sheets

U.S. PATENT DOCUMENTS

| | | | |
|---|---|---|---|
| 6,735,204 B1 * | 5/2004 | Wang et al. .............. | 370/395.1 |
| 6,760,335 B1 * | 7/2004 | Andersson et al. ...... | 370/395.2 |
| 6,804,246 B1 * | 10/2004 | Petersen et al. ........ | 370/395.64 |
| 6,834,053 B1 * | 12/2004 | Stacey et al. ............ | 370/395.4 |
| 2001/0030966 A1 | 10/2001 | Choi | |

OTHER PUBLICATIONS

Saito, "Bandwidth Management for AAL2 Traffic", IEEE Transactions on Vehicular Technology, vol. 49, No. 4, Jul. 2000, pp. 1364-1377.

International Search Report mailed Sep. 11, 2002.

Saito, "Effectiveness of UBR VC Approach in AAL2 Networks and its Application to IMT-2000", *IEICE Trans. Commun.*, vol. E83-B, No. 11, Nov. 2000, pp. 2486-2493.

Andersson et al, U.S. Appl. No. 09/460,238, filed Dec. 13, 1999, entitled "Dynamic Negotiation of Resources for User Equipment in Wireless Communications System".

* cited by examiner

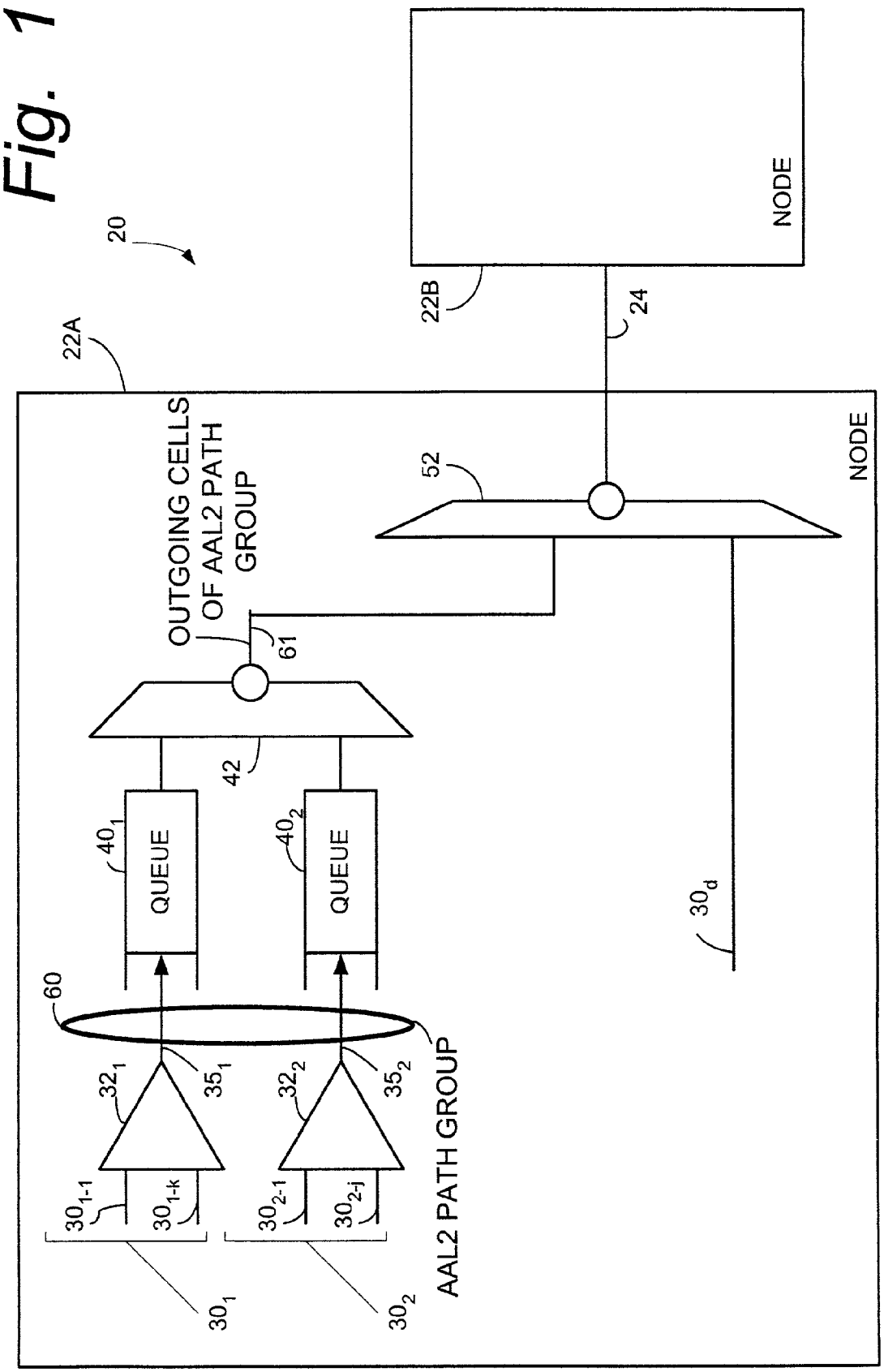

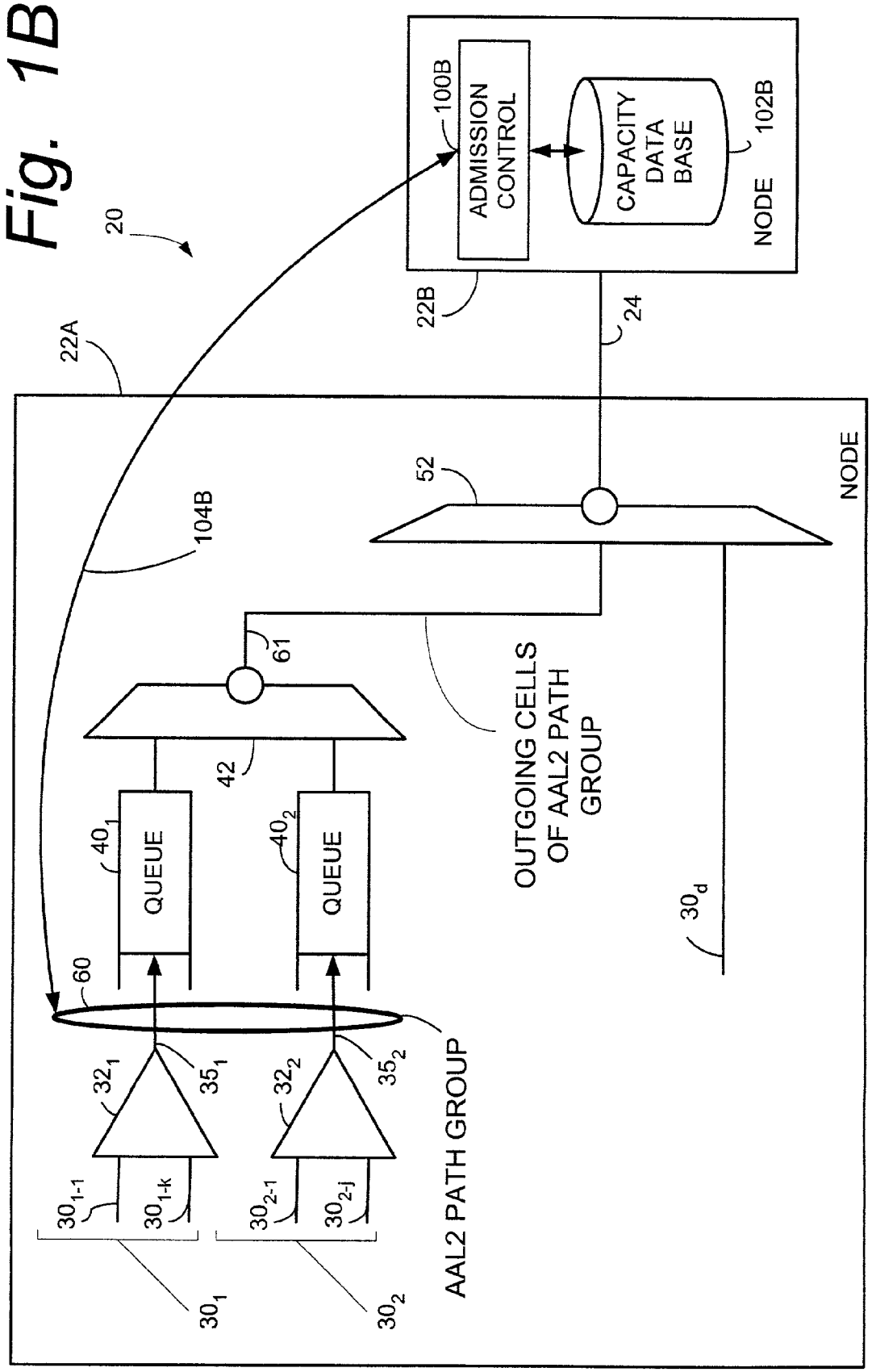

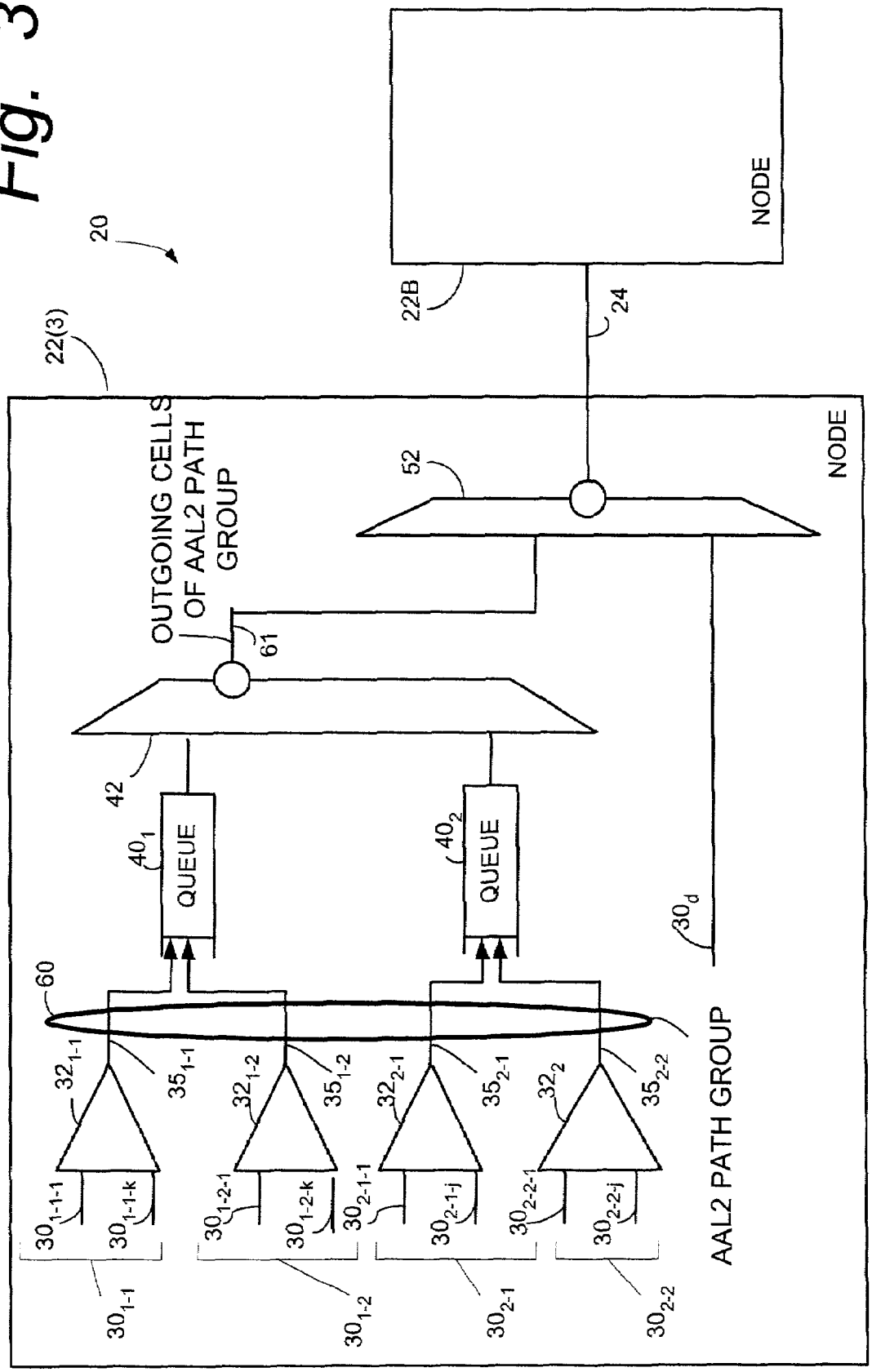

BANDWIDTH EFFICIENT QUALITY OF SERVICE SEPARATION OF AAL2 TRAFFIC

BACKGROUND

1. Field of the Invention

The present invention pertains to wireless telecommunications, and particularly to transmission of AAL2 cells having differing Quality of Service (QoS) requirements.

2. Related Art and Other Considerations

Asynchronous Transfer Mode (ATM) is now commonly used in communication networks. ATM is a packet-oriented transfer mode which uses asynchronous time division multiplexing techniques. Packets are called cells and have a fixed size.

An ATM cell consists of 53 octets, five of which form a header and forty eight of which constitute a "payload" or information portion of the cell. The header of the ATM cell includes two quantities which are used to identify a connection in an ATM network over which the cell is to travel, particularly the VPI (Virtual Path Identifier) and VCI (Virtual Channel Identifier). In general, the virtual path is a principal path defined between two switching nodes of the network; the virtual channel is one specific connection on the respective principal path.

Between termination points of an ATM network a plurality of nodes are typically situated, such as switching nodes having ports which are connected together by physical transmission paths or links. The switching nodes each typically have several functional parts, a primary of which is a switch core. The switch core essentially functions like a cross-connect between ports of the switch. Paths internal to the switch core are selectively controlled so that particular ports of the switch are connected together to allow a cell ultimately to travel from an ingress side of the switch to an egress side of the switch.

A protocol reference model has been developed for illustrating layering of ATM. The protocol reference model layers include (from lower to higher layers) a physical layer (including both a physical medium sublayer and a transmission convergence sublayer), an ATM layer, and an ATM adaptation layer (AAL), and higher layers. The basic purpose of the AAL layer is to isolate the higher layers from specific characteristics of the ATM layer by mapping the higher-layer protocol data units (PDU) into the information field of the ATM cell and vise versa. There are several differing AAL types or categories, including AAL0, AAL1, AAL2, AAL3/4, and AAL5.

AAL2 is a standard defined by ITU recommendation I.363.2. An AAL2 packet comprises a three octet packet header, as well as a packet payload. The AAL2 packet header includes an eight bit channel identifier (CID), a six bit length indicator (LI), a five bit User-to-User indicator (UUI), and five bits of header error control (HEC). The AAL2 packet payload, which carries user data, can vary from one to forty-five octets. Plural AAL2 packets can be inserted into a standard ATM cell. Thus, ATM Adaptation Layer Type 2, i.e., AAL2, facilitates multiplexing of plural AAL2 user connections on a common AAL2 path, established as a single ATM Virtual Channel Connection (VCC).

In an ATM based telecommunications system where different quality of service classes are supported, some connections are more delay sensitive than others. In order to cater to these differing sensitivities, ATM cells of differing priority must be handled. Such ATM cell handling can include specific traffic management per ATM-VCC with weighted fair queuing, early packet discard, available bit rate (ABR) accommodation, and shaping of outgoing traffic according to a traffic contract, for example. Handling of ATM traffic management is specified in the ITU I.371 Recommendation or in ATM-FORUM Traffic Management Specification 4.0.

The Universal Mobile Telecommunications (UMTS) Terrestrial Radio Access Network (UTRAN) is a third generation radio access network which, in some respects, builds upon the radio access technology known as Global System for Mobile communications (GSM) developed in Europe. The UTRAN covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UEs) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks. UTRAN is essentially a wideband code division multiple access (W-CDMA) system.

In the UTRAN network, several types of control and user data connections use AAL2. These differing types of connections have differing quality of service (QoS) requirements, such as differing maximum delay tolerance, for example. However, standardized AAL2 does not provide any means for quality of service differentiation between connections on the same AAL2 path. This means that, when connections of different types share an AAL2 path, that shared path has to be dimensioned according to the quality of service requirements of the connection type having the most stringent such requirement (e.g., most stringent QoS).

In view of the foregoing, in some cases it is necessary to establish separate AAL2 paths for the more delay-sensitive traffic (such as conversational traffic, e.g., speech) and less delay-sensitive traffic (such as data traffic) in order to ensure that the most stringent requirements for the more delay-sensitive traffic can be met. In such cases, the AAL2 connections are typically divided into two quality of service (QoS) categories, and an AAL2 path is established to serve each of the AAL2 connection categories. Even the less delay-sensitive connections (e.g., data traffic connections) have strict maximum delay tolerance, although such tolerance is higher than for the delay-sensitive traffic (e.g., speech traffic).

In an implementation of the separate AAL2 paths as described in the preceding paragraph, one AAL2 path can, depending on the eight bit size of the connection identifier (CID), support a maximum of 248 AAL2 connections (some CID values are reserved for other purposes). When a higher number of connections must be supported between adjacent nodes, multiple AAL2 paths must be established.

Thus, conventional practice when handling AAL2 connections with differing QoS categories is to separate the different services on different AAL2 paths (ATM VCCs) with reserved bandwidth on each AAL2 path. The ITU-T AAL2 standards include basic signaling methods to support such separation of AAL2 connections on different AAL2 path types and to set up these AAL2 paths on ATM VCCs with different ATM traffic contracts. For example, AAL2 cells carrying conversational (e.g., speech) traffic may be assigned to AAL2 paths with a first QoS class; AAL2 cells carrying non-conversational (e.g. data) traffic may be assigned to AAL2 paths with a second QoS class (lower than the first QoS class). AAL2 paths of both QoS classes are carried by the same ATM physical link.

In general, the type of ATM service category appropriate for AAL2 paths is Deterministic Bit Rate (DBR), which in the parlance of the ATM Forum is Constant Bit Rate (CBR). For this service category, ATM link resources are reserved according to the peak cell rate (PCR) of each VCC.

In a case in which several AAL2 paths are needed for QoS separation or connection capacity reasons, it is inefficient to allocate a fixed part of the link capacity to each AAL2 path. While the maximum total traffic over a physical link may be possible to estimate based on the capacity of the served radio interfaces (e.g., in the UTRAN), the relative proportion of conversational versus data traffic is more difficult to predict and is expected to change with time. If each path is dimensioned separately according to its expected maximum traffic intensity, more link capacity must be reserved than if the link were dimensioned according to the sum of the traffic on the AAL2 paths of the both types.

Saito, "Effectiveness of UBR VC Approach in AAL2 Networks and Its Application to IMT-2000", *IEICE Trans. Commun.*, Vol. E83-B, No. 11, November 2000, pp. 2486-2493, proposes a bandwidth management alternative which performs bandwidth management (using unspecified bit rate (UBR) for each VC) at a VP level (virtual path) rather than at a VC level. However, the Saito proposal has various limitations. For example, it assumes that the VP carries nothing other than AAL2 traffic, and also that all AAL2 connections are of the same QoS class. As an example, the Saito proposal does not take into consideration that other types of ATM VCCs, for example AAL5 connections carrying signaling, or operation and maintenance traffic could be included on the VP. Moreover, Saito does not address how differing QoS requirements for differing AAL2 connections should be handled.

What is needed, therefore, and an object of the present invention, is a technique which facilitates bandwidth efficient quality of service (QoS) separation of AAL2 traffic.

BRIEF SUMMARY OF THE INVENTION

The present invention concerns an AAL2 path group which comprises plural AAL2 paths with the same or different QoS classes. Bandwidth on the ATM layer is reserved for the AAL2 path group rather than to the individual AAL2 path exclusively. An admission decision regarding an AAL2 connection seeking to use an AAL2 path belonging to the AAL2 path group is based on available bandwidth of the AAL2 path group rather than available bandwidth of the individual AAL2 path. ATM VCCs which comprise the AAL2 path group are transported on a virtual path (VP) together with ATM VCCs of a different type (e.g., a second type which differs from a first type of ATM VCCs which comprise the AAL2 path group).

The present invention also concerns an Asynchronous Transfer Mode (ATM) network which implement the AAL2 path group of the invention, as well as a node of such network. The Asynchronous Transfer Mode (ATM) network which implements the AAL2 path group comprises a first network node; a second network node; and, an ATM virtual path (VP) connecting the first network node and the second network node. One of the network nodes comprises a plurality of AAL2 queues; a path group scheduler; non-path group ATM virtual circuits (VCs); and, a VP scheduler which applies ATM cells of the path group and the non-path group ATM virtual circuits (VCs) to the ATM virtual path (VP) for transmission to the second network node. Each of the plurality of AAL2 queues contains ATM cells from at least one AAL2 path. The path group scheduler selects ATM cells from the plurality of AAL2 queues to form the AAL2 path group. The non-path group ATM virtual circuits (VCs) include ATM cells of a second type (e.g. AAL5) other than the ATM cells of a first type which comprise the AAL2 path group.

The AAL2 path group also features quality of service (QoS) separation, e.g., differing treatment for differing AAL2 connections within the AAL2 path group based on the QoS requirements for the differing AAL2 connections.

As one aspect of the invention, a connection admission controller unit admits connections to the AAL2 paths comprising the AAL2 path group based on available bandwidth of the AAL2 path group rather than available bandwidth of an individual AAL2 path. The connection admission controller unit can be situated at the same network node as the plurality of AAL2 queues; the path group scheduler; the non-path group queue; and, the VP scheduler. Alternatively, the connection admission controller unit can be situated at a node other than the network node which has the plurality of AAL2 queues; the path group scheduler; the non-path group queue; and, the VP scheduler.

In the present invention, ATM cells of the first type comprising the AAL2 path group are transmitted over the same virtual path (VP) as ATM cells of a second, non-AAL2 type. Advantageously, the first type of ATM cells and second type of ATM cells can be delineated in various different ways. In one mode of the invention, the first type of ATM cells comprises AAL2 traffic cells and the second type of ATM cells comprises cells dedicated to for example signaling, operation and maintenance, or synchronization. The ATM cells of the second type thus can be cells which require a guaranteed bandwidth. In another mode the VP only comprises ATM cells of the first type. Additionally, the first type of ATM cells can comprise cells from AAL2 paths with different QoS classes. For example, the first type of ATM cells can comprise AAL2 cells having an unspecified bit rate (UBR) and the second type of ATM cells can comprise AAL2 cells have a bit rate type other than UBR.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1 is a schematic view of a telecommunications system comprising nodes, with at least one of the nodes being partly illustrated in example fashion as forming an AAL2 path group in accordance with the present invention.

FIG. 1B is a schematic view of a variation of the telecommunications system of FIG. 1 wherein a node which forms an AAL2 path group does not include admission control.

FIG. 3 is a schematic view of a variation of the telecommunications system of FIG. 1 which employs a different pre-AAL2 path group scheduler front end.

DETAILED DESCRIPTION OF THE DRAWINGS

Figure 1A:
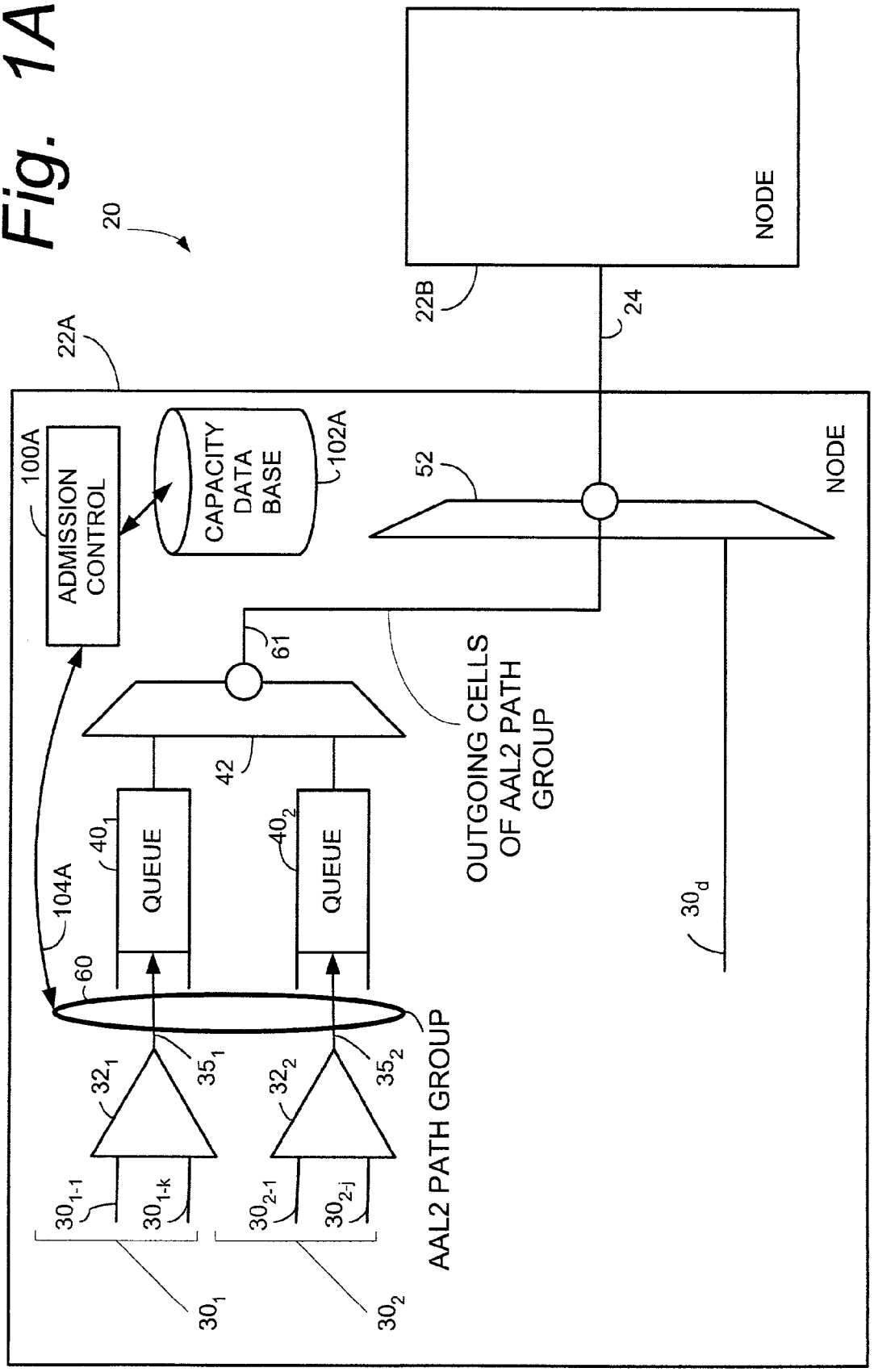
FIG. 1A is a schematic view of a variation of the telecommunications system of FIG. 1 wherein a node which forms an AAL2 path group also includes admission control.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

FIG. 1 shows, in representative, non-limiting fashion, a telecommunications system 20 having two example nodes 22A and 22B which are connected by an ATM virtual path (VP) realized by physical link 24. As described in more detail below, telecommunications system 20 implements an AAL2 path group according to the present invention. In the illustrated embodiment, node 22A is broadly configured to implement the inventive AAL2 path group, and in particular with regard to incoming ATM virtual circuits (VCs) shows a first plurality of incoming AAL2 connections $30_1$ (comprising AAL2 connections $30_{1-1}$ through $30_{1-k}$ for carrying AAL2 traffic); a second plurality of incoming AAL2 connections $30_2$ (comprising AAL2 connections $30_{2-1}$ through $30_{2-j}$ also for carrying AAL2 traffic); and, an ATM VC $30_d$ which carries ATM cells of a different type than are carried on incoming AAL2 connections $30_1$ and $30_2$.

Node 22A also comprises an AAL2 multiplexer for each plurality of incoming AAL2 connections (e.g., AAL2 multiplexer $32_1$ for plurality $30_1$ and AAL2 multiplexer $32_2$ for plurality $30_2$); an AAL2 path 35 output which is output from each AAL2 multiplexer; a plurality of AAL2 queues represented by AAL2 queues $40_1$ and $40_2$; AAL2 path group scheduler 42; and VP scheduler 52. In the illustrated scenario of FIG. 1, inputs to queues $40_1$ and $40_2$ are connected to AAL2 paths $35_1$ and $35_2$ which, in turn, are fed by AAL2 multiplexer $32_1$ and $32_2$, respectively. AAL2 path group scheduler 42 selects cells from queues $40_1$ and $40_2$ in accordance with a predetermined selection strategy or logic. The AAL2 paths which feed the queues $40_1$, $40_2$ from which AAL2 path group scheduler 42 selects ATM cells comprise an AAL2 path group 60, and thus AAL2 cells output by AAL2 path group scheduler 42 on line 61 comprise cells of the AAL2 path group 60. The VP scheduler 52 applies ATM cells of the AAL2 path group 60 as well as cells from one or more non-path group VCs (e.g., ATM VC $30_d$) to the ATM virtual path (VP) 24 for transmission to the second network node 22B.

Each of the plurality of AAL2 queues $40_1$, $40_2$, contains ATM AAL2 cells from at least one AAL2 path. The AAL2 path group scheduler 42 selects ATM AAL2 cells from the plurality of AAL2 queues $40_1$, $40_2$, with the AAL2 cells discharged by AAL2 path group scheduler 42 on line 61 constituting cells of the AAL2 path group. The bandwidth of an individual AAL2 path comprising the AAL2 path group 60 is contributed to a total bandwidth of the AAL2 path group rather than to the individual AAL2 path exclusively.

In one example context of implementation of the present invention the CID of an AAL2 cell stream is employed to identify a user traffic connection. In the present invention, an admission decision regarding a user seeking to establish a connection which employs a certain one of the AAL2 paths belonging to the AAL2 path group is based on available bandwidth of the entire AAL2 path group 60, rather than available bandwidth of that certain AAL2 path individually. That admission decision is made by an admission control function, which has access to the capacities and capabilities of the network including the collective (e.g., total) bandwidth of the AAL2 path group (e.g., the total bandwidth of the AAL2 paths comprising the AAL2 path group).

In an embodiment depicted in FIG. 1A, the admission control function is shown as an admission controller 100A which is located in node 22A, i.e., in the same node with the structure (e.g., AAL2 path group scheduler 42) which forms the AAL2 path group sending cells out from node 22A. The admission controller 100A is connected to and accesses a database, referenced for simplicity herein as "capacity database" 102A. The capacity database 102A stores configuration parameters for network 20 and for various constituent nodes, including the bandwidth capacity for each of the AAL2 paths $35_1$ and $35_2$. As indicated by arrow 104A, admission controller 100A is configured to realize that the AAL2 paths $35_1$ and $35_2$ comprise the AAL2 path group 60 of the present invention, and thus any admission decision, such as a decision whether to admit a new connection over one of the AAL2 paths $35_1$ and $35_2$, is assessed with respect to the total available bandwidth of the AAL2 path group 60 rather than to the available bandwidth of any particular AAL2 path. Thus, it is not necessary for the capacity database to store a bandwidth for each individual AAL2 path.

In the embodiment of FIG. 1A, node 22A may be a radio network control (RNC) node such as is employed in the radio access network of the Universal Mobile Telecommunications (UMTS) Terrestrial Radio Access Network (UTRAN), as admission control functions are generally performed by RNC nodes in UTRAN. In such embodiment, node 22B can be any other node connected to a RNC, such as a base station (BS) node (e.g., Node B), for example. In the case of node 22B being a base station (BS) node, the base station (BS) node 22B may have structure comparable to node 22A for forming a AAL2 path group which is transmitted from node 22B to node 22A, with admission control of connections involving segments between node 22A and node 22B being controlled by either admission controller 100A or a local admission controller in node 22B.

In another embodiment depicted in FIG. 1B, the admission control function is shown as an admission controller 100B which is located in node 22B. In other words, node 22A with the structure (e.g., AAL2 path group scheduler 42) which forms the AAL2 path group sending cells does not have an admission control function in the same node. Rather, as illustrated by arrow 104B, admission control regarding the AAL2 path group comprised of AAL2 paths $35_1$ and $35_2$ is performed by admission controller 100B situated in node 22B. The node 22A of the embodiment of FIG. 1B can be, for example, a base station (BS) node of a UTRAN, as alluded to in the preceding paragraph.

Figure 2A:
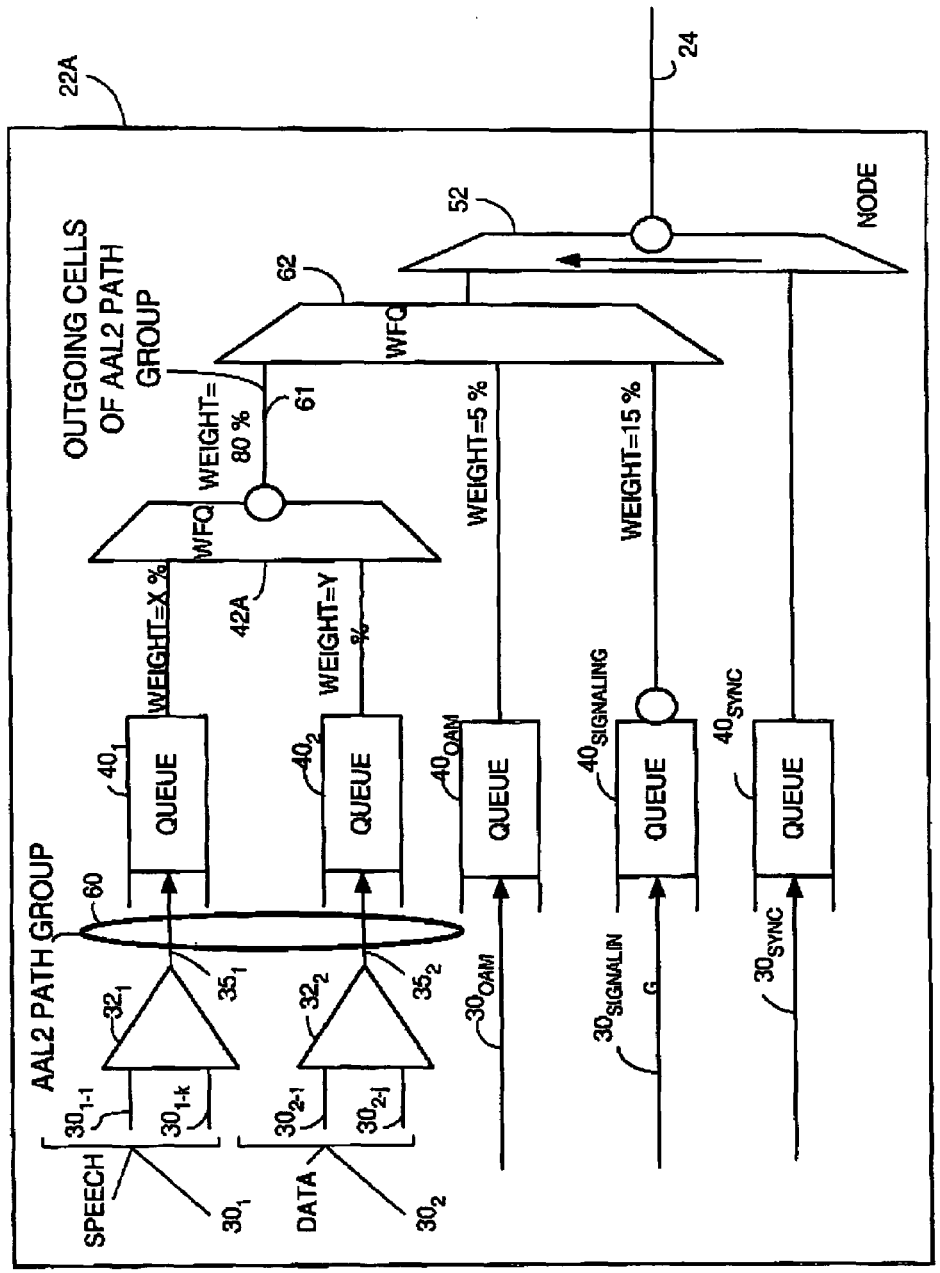
FIG. 2A-FIG. 2C are schematic view of portions of nodes which form an AAL2 path group in accordance with differing embodiments of the present invention.
Figure 2B:
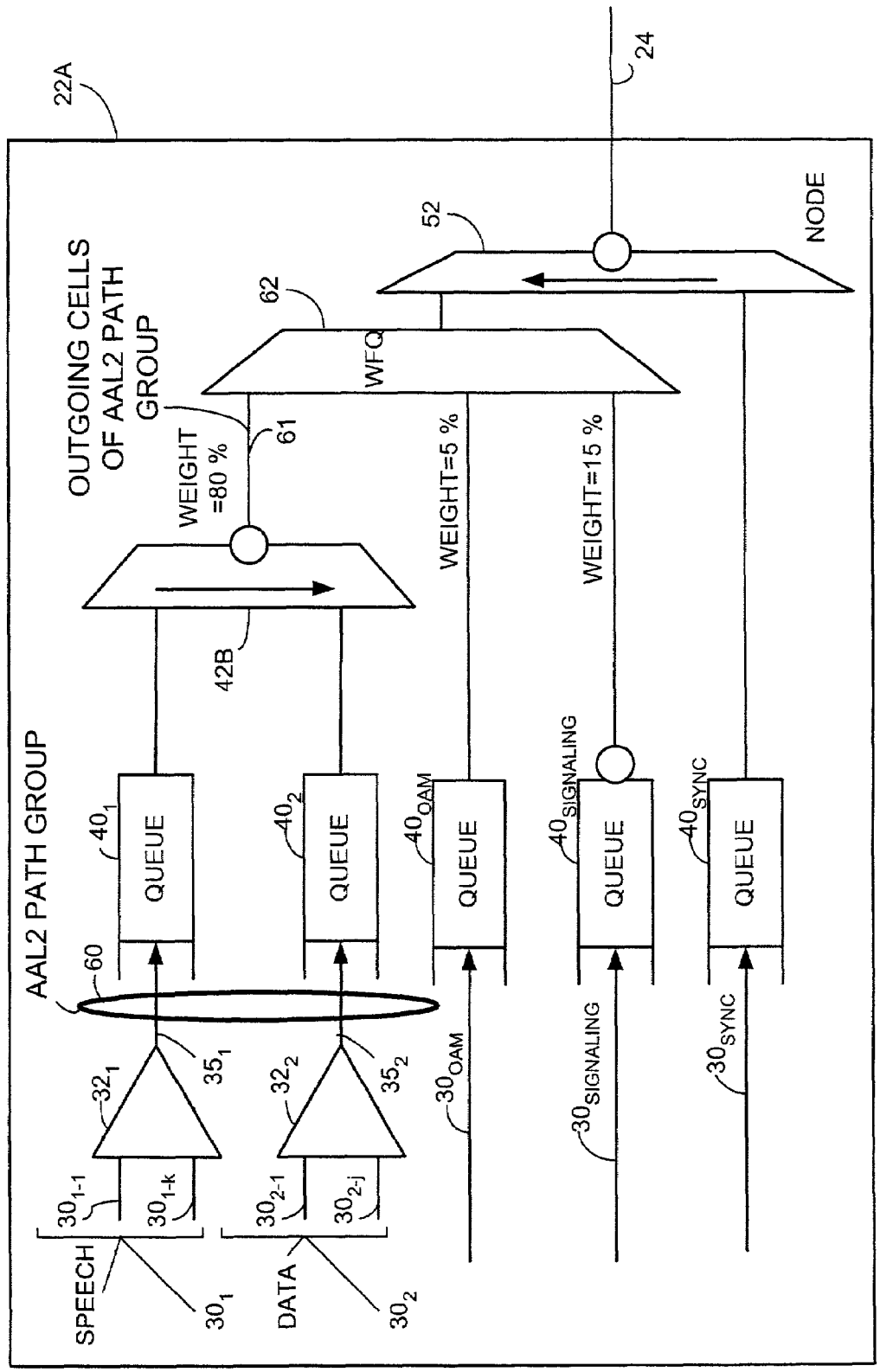
Figure 2C:
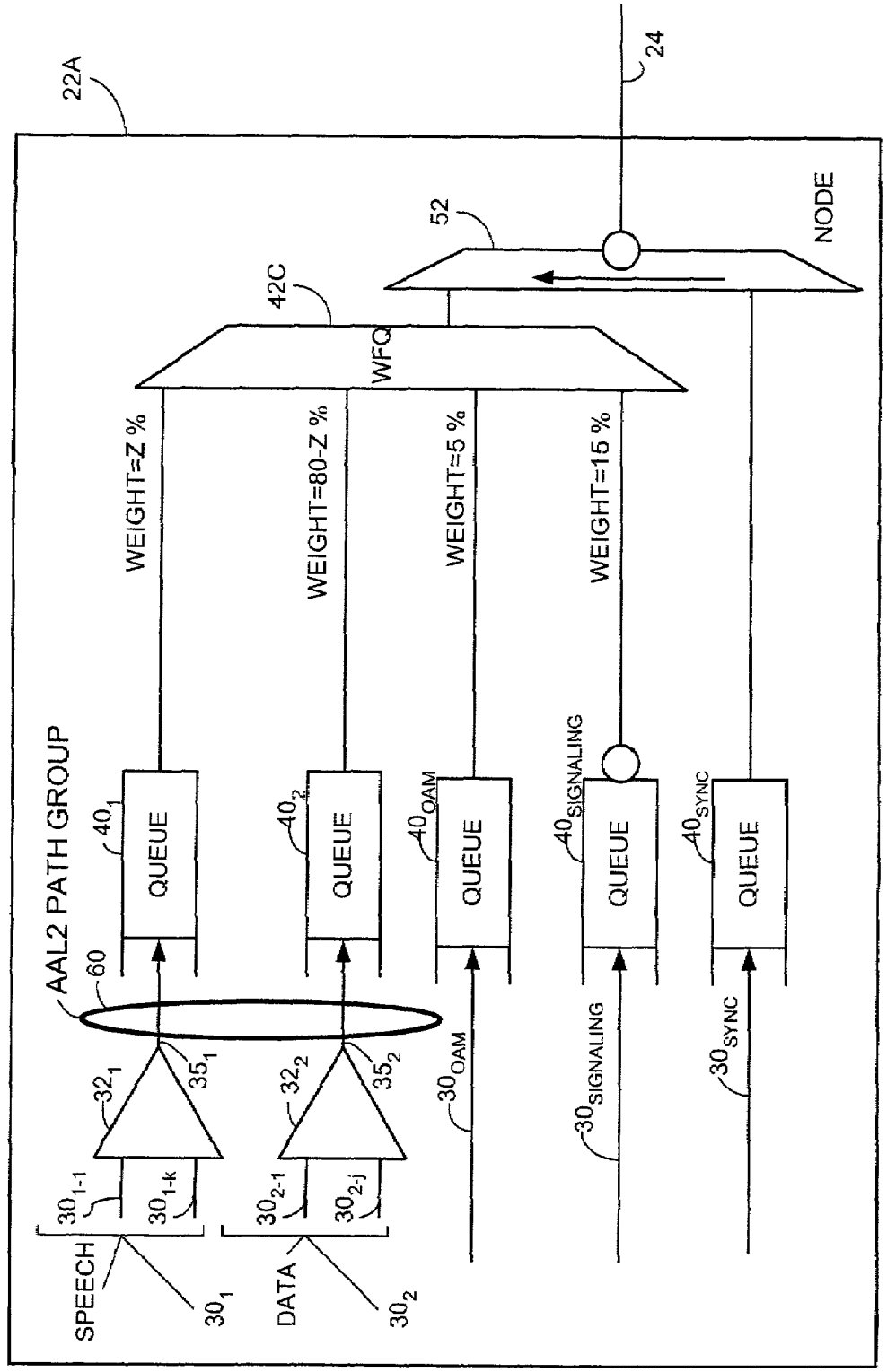

FIG. 2A-FIG. 2C show, in accordance with differing embodiments, examples of how node 22A can be configured to form an AAL2 path group in accordance with the present invention. While the admission control aspect is not explicitly illustrated in FIG. 2A-FIG. 2C, it should be understood that admission control can be provided in various manners (such as inclusion of admission controller 100A in node 22A as shown in FIG. 1A or inclusion of admission controller 100B in node 22B as shown in FIG. 1B).

Node 22A of FIG. 2A has a AAL2 path group scheduler 42A which is fed in the same manner as FIG. 1, which means that the AAL2 path group comprises the AAL2 paths $35_1$ and $35_2$. FIG. 2A (like FIG. 2B and FIG. 2C) specifies that the AAL2 path $35_1$ is comprised of speech (e.g., conversational) AAL2 connections, while the AAL2 path $35_2$ is comprised of data (e.g., non-speech or non-conversational) AAL2 connections. In the FIG. 2A embodiment, AAL2 path group scheduler 42A is a Weighted Fair Queue scheduler which selects cells from queue $40_1$ (e.g., cells with speech payloads) according to a weight of X % and which selects cells from queue $40_2$ (e.g., cells with data payloads) according to a weight of Y %. The circle symbol employed at the output port of AAL2 path group scheduler 42A is utilized in the industry to denote a traffic shaping function performed by AAL2 path group scheduler 42A. In particular, the outgoing traffic is shaped to the peak cell rate (PCR).

Whereas in FIG. 1 ATM cells of a different type than those comprising the AAL2 path group are generically depicted as being applied on path $30_d$, FIG. 2A-FIG. 2C show with more specificity some examples of such differing types of ATM cells. For example, FIG. 2A shows VC $30_{OAM}$ which carries cells utilized for operation and maintenance purposes (e.g., operator commands, maintenance statistics, alarms, etc.). Cells received on VC $30_{OAM}$ are applied to queue $40_{OAM}$, with an output of queue $40_{OAM}$ being applied to intermediate scheduler 62. As another example, FIG. 2A shows an VC $30_{SIGNALING}$ which carries cells utilized for signaling purposes (e.g., for setting up and tearing down connections, including admission control signaling). Cells received on VC $30_{SIGNALING}$ are applied to queue $40_{SIGNALING}$, with an output of queue $40_{SIGNALING}$ also being applied to intermediate scheduler 62. As yet another example, FIG. 2A shows an VC $30_{SYNC}$ which carries cells utilized for synchronization purposes. Cells received on VC $30_{SYNC}$ are applied to queue $40_{SYNC}$, with an output of queue $40_{SYNC}$ being applied to VP scheduler 52.

The intermediate scheduler 62 thus receives, as input, cells forming AAL2 path group as output on line 61 from AAL2 path group scheduler 42A, as well as OAM cells from queue $40_{OAM}$ and cells with signaling information from queue $40_{SIGNALING}$. In the illustrated embodiment, intermediate scheduler 62 is uses Weighted Fair Queueing, and accords cells comprising the AAL2 path group a weight of 80%, the OAM cells a weight of 5%, and the signaling cells from queue $40_{SIGNALING}$ a weight of 15%. The illustrated percentage weightings are merely illustrative, as other percentage weightings can be employed in other embodiments. The output of intermediate scheduler 62 is applied to a first input of VP scheduler 52; synchronization cells stored in queue $40_{SYNC}$ are applied to a second input of VP scheduler 52. The VP scheduler 52 of the FIG. 2A embodiment is a strict priority input scheduler which schedules application of outgoing cells onto virtual path 24 in accordance with the direction of the arrow (e.g., with synchronization cells in queue $40_{SYNC}$ always having a highest priority).

Node 22B of the embodiment of FIG. 2B is similar to node 22A of the embodiment of FIG. 2A, but differs primarily in that AAL2 path group scheduler 42B is a strict priority input scheduler which always gives cells queue $40_1$ (e.g., cells having speech payload) precedence or priority over cells in queue $40_2$ (e.g., cells having data payload). The order of the priority is indicated by the downward pointing arrow symbolized in the interior of AAL2 path group scheduler 42B.

Node 22C of the embodiment of FIG. 2C is also similar to node 22A of the embodiment of FIG. 2A, but its scheduler 42C is not dedicated to scheduling the AAL2 path group only. Rather, scheduler 42C is a Fair Weight Queue scheduler which also consolidates therein the functions of intermediate scheduler 62. The output of AAL2 path group scheduler 42C is applied to a first input of VP scheduler 52; the synchronization cells stored in queue $40_{SYNC}$ are applied to a second input of VP scheduler 52. The VP scheduler 52 of the FIG. 2C embodiment is a strict priority input scheduler which schedules application of outgoing cells onto virtual path 24 in accordance with the direction of the arrow (e.g., with synchronization cells in queue $40_{SYNC}$ always having a highest priority).

The embodiments previously illustrated have shown, by way of example, a dedicated queue 40 for each AAL2 path. However, it should be understood that the particular elements comprising a front end leading to the input(s) of AAL2 path group scheduler 42 are not critical to the present invention and that other configurations are within the scope of the invention. For example, FIG. 3 illustrates another example embodiment in which plural AAL2 paths carrying AAL2 connections with the same quality of service (QoS) requirements are queued together. As shown in FIG. 3, queue $40_1$ is fed by AAL2 paths $35_{1-1}$ and $35_{1-2}$, while queue $40_2$ is fed by AAL2 paths $35_{2-1}$ and $35_{2-2}$. In the example illustration of FIG. 3, each AAL2 path carries plural AAL2 connections having the same quality of service (QoS) requirements. For example, AAL2 path $35_{1-1}$ carries AAL2 connection $30_{1-1-1}$ through $30_{1-1-k}$, all of these connections having the same QoS. Moreover, AAL2 path $35_{1-2}$ carries AAL2 connection $30_{1-2-1}$ through $30_{1-2-k}$, all of these connections having the same QoS.

Thus, there can be a number of connections/queues per traffic type. Common to all illustrated embodiments, however, is the fact that more delay sensitive traffic (e.g., conversational or speech traffic) and less delay sensitive traffic (e.g., non-conversational or data traffic) are separated into different queues to prevent head of line blocking.

In the present invention, ATM cells of the first type comprising the AAL2 path group 60 are transmitted over a same virtual path (VP) (e.g., virtual path 24) with ATM cells of a second type. Advantageously, the first type of ATM cells and second type of ATM cells can be delineated in various different ways.

In one mode of the invention, the first type of ATM cells which are carried over the paths comprising the AAL2 path group are AAL2 traffic cells while the second type of ATM cells comprises cells dedicated to at least one of signaling, operation and maintenance, and synchronization. The embodiments of FIG. 2A-FIG. 2C typify such mode, since cells from VC $30_{OAM}$, VC $30_{SIGNALING}$, and VC $30_{SYNC}$ are all eligible for scheduling by VP scheduler 52, along with the cells carried by AAL2 path group, for application on virtual path (VP) 24. The ATM cells of the second type thus can be cells which require a guaranteed bandwidth.

As an alternative way of describing this phenomena, the first type of ATM cells can comprise AAL2 cells and the second type of ATM cells can comprise non-AAL2 cells (e.g., ATM cells that have another adaptation layer type). As a further alternative, the first type of ATM cells can comprise cells from AAL2 paths with differing QoS classes. For example, the first type of ATM cells which comprise the AAL2 path group can be AAL2 cells having an unspecified bit rate (UBR) and the second type of ATM cells can comprise AAL2 cells have a bit rate type other than UBR.

As mentioned above, in the present invention several AAL2 paths on the same physical link are handled together in an AAL2 path group with an assigned bandwidth. The bandwidth on the ATM layer is reserved for the AAL2 path group, rather than for the individual AAL2 path. Then, at establishment of an AAL2 connection, the connection admission control is calculated against the available bandwidth of the AAL2 path group and not against the bandwidth of the chosen AAL2 path. CID assignment within AAL2 is performed in the normal way, e.g., chosen for each individual AAL2 path. As illustrated in various foregoing embodiments, conversational (e.g., speech) traffic and non-conversational traffic (e.g., data) are separated on different AAL2 paths, and also queued separately.

Figure 4:
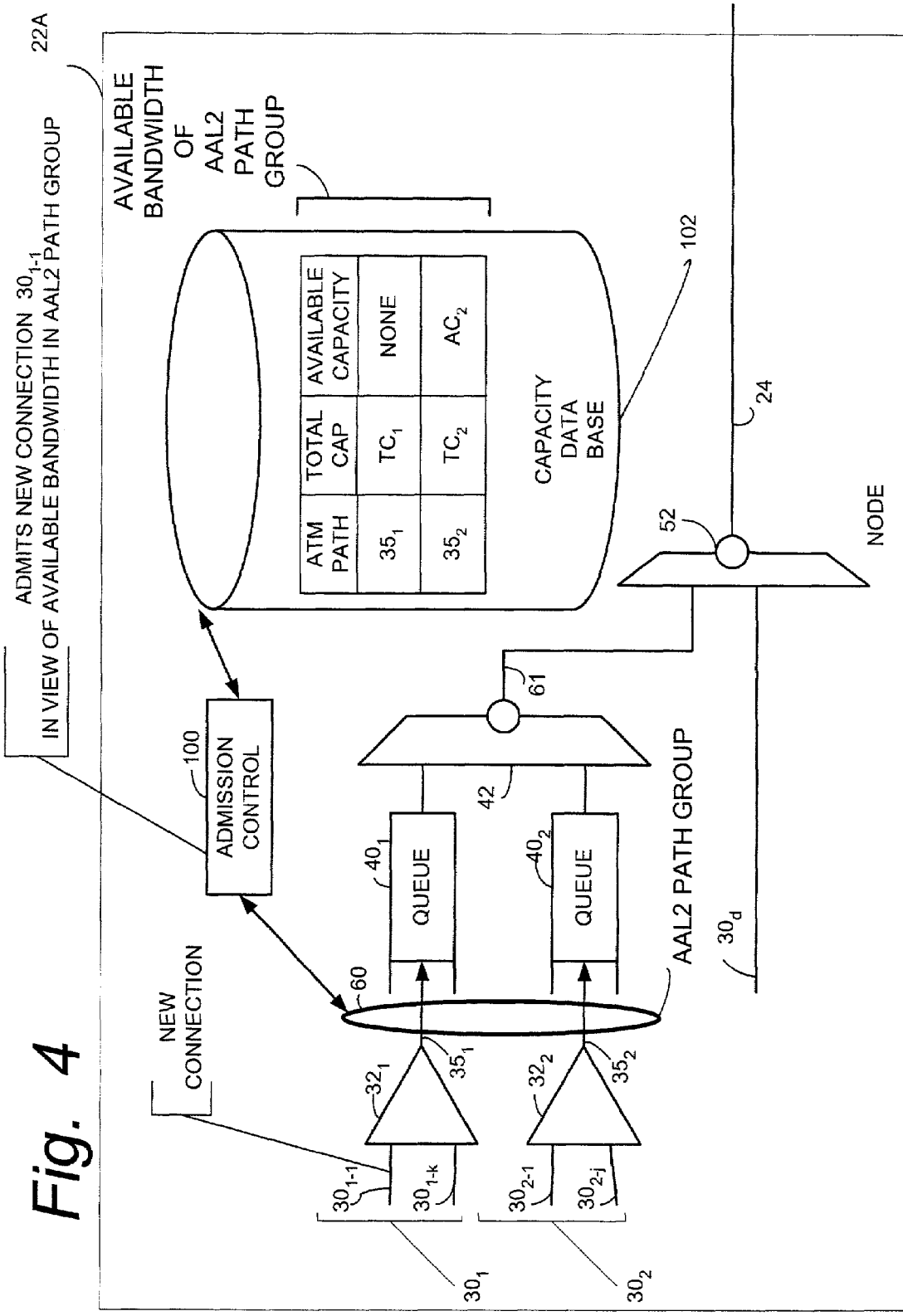
FIG. 4 is a partially schematic, partially diagrammatic view showing an admission control scenario according to a mode of the invention in an example context of FIG. 1A.

FIG. 4 shows, in the context of the embodiment of FIG. 1A, admission of a new connection to the AAL2 path group in an illustrative scenario. The capacity database 102 shows, for each AAL2 path, a total capacity and an available capacity. For example, AAL2 path $35_1$ has a total capacity $TC_1$ but no available capacity, whereas AAL2 path $35_2$ has a total capacity $TC_2$ and an available capacity $AC_2$. At the time shown in FIG. 4, a new connection $30_{1-1}$ is sought over AAL2 path $35_1$. Since AAL2 path $35_1$ has no available capacity, traditional admission control techniques would either reject the requested new connection $30_{1-1}$ or cut off an existing connection carried on AAL2 path $35_1$ in order to make room for the requested new connection. In accordance with the present invention, by contrast, admission controller 100 realizes that, while AAL2 path $35_1$ has no available capacity, the AAL2 path group 60 which includes AAL2 path $35_1$ has available capacity. For example, AAL2 path $35_2$ is one of the AAL2 paths comprising the AAL2 path group 60 which has spare capacity. Assuming the total spare capacity of the AAL2 path group exceeds the bandwidth required for the requested new connection $30_{1-1}$, in accordance with the present invention the admission controller 100 admits the new requested connection.

While the admission control scenario of FIG. 4 has been described in the context of the embodiment of FIG. 1A, it should be realized that the present invention is not limited by such context, and that other contexts such as the embodiment of FIG. 1B are also within the purview of the present invention.

As reflected in the embodiments hereinabove described, the AAL2 path group also features quality of service (QoS) separation, e.g., differing treatment for differing AAL2 connections within the AAL2 path group based on the QoS requirements for the differing AAL2 connections. For example, AAL2 connections having differing QoS requirements can be queued separately upstream of the AAL2 path group scheduler 42. Moreover, the AAL2 path group scheduler 42 can provide a preference or weighting in view of the QoS parameters for the respective AAL2 connections. In the embodiments of FIG. 2A and FIG. 2C, for example, AAL2 path group scheduler 42A and AAL2 path group scheduler 42C, respectively, can weight the AAL2 VCs having speech traffic payload more heavily than the AAL2 VCs having data traffic payloads. Or in the embodiment of FIG. 2B, the AAL2 path group scheduler 42B by its strict priority nature assigns a higher priority to the AAL2 VCs having speech traffic payload than the AAL2 VCs having data traffic payloads.

The present invention assigns bandwidth to its AAL2 path group instead of each individual AAL2 path, thereby affording efficient bandwidth utilization. Allocation of bandwidth resources for AAL2 connections is thus made against the pooled resources of multiple AAL2 paths rather than against a fixed resource per path. In the present invention, the AAL2 paths themselves are treated as having UBR (unspecifiedbit rate), but the AAL2 path group is considered as a whole to have CBR (constant bit rate). ATM layer transmission scheduling is also performed in such a way that all AAL2 paths are scheduled together as a single stream of ATM cells.

The present invention advantageously accommodates both UBR and non-UBR VCs (assigned to something other than AAL2) when performing AAL2 connection admission control against the bandwidth of the virtual path (VP). The invention does not require that only AAL2 path VCs be setup within a virtual path. By contrast, prior art techniques which perform connection admission control for AAL2 against the virtual path bandwidth must dedicate the entire virtual path to AAL2.

Moreover, the present invention only requires one virtual path between two nodes, which is economically desirable when transport is leased from an ATM transport network provider. Leasing one virtual path of, e.g., 2 Mbit/s is much cheaper than leasing two virtual paths with 1 Mbit/s each. Further, the present invention provides a better multiplexing gain on the ATM level when all cells are multiplexed on the same virtual path.

In one variation of the invention, different services can be separated on different virtual paths, although such variation may not yield efficient bandwidth utilization when using public VP networks, with course granularity of the possible rates.

The present invention is particularly applicable to AAL2 nodes, but advantageously does not have any impact on intermediate, pure ATM nodes, provided that such intermediate ATM nodes must have virtual path switches (e.g., cross-connects).

While embodiments of the present invention have already been said to be applicable to nodes such as radio network control (RNC) nodes and base station (BS) nodes, the invention is not limited to such nodes. For example, the present invention can also be utilized with other nodes such as media gateways.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of managing traffic for transport on an Asynchronous Transfer Mode (ATM) virtual path (VP), the method comprising:

forming an ATM Adaptation Layer 2 (AAL2), path group which comprises plural AAL2 paths, the AAL2 path group comprising a first type of ATM cells from AAL2 paths with differing quality of service (QoS) classes;

admitting connections based on available bandwidth of the AAL2 path group rather than available bandwidth of an individual AAL2 path;

including, for transport on a same virtual path (VP), ATM cells of a second type other than the first type of ATM cells which comprise the AAL2 path group.

2. The method of claim 1, wherein the first type of ATM cells comprises AAL2 traffic cells and the second type of ATM cells comprises cells dedicated to at least one of signaling, operation and maintenance, and synchronization.

3. The method of claim 1, wherein the second type of ATM cells comprises cells which require a guaranteed bandwidth.

4. The method of claim 1, wherein the first type of ATM cells comprises AAL2 cells and the second type of ATM cells comprises non-AAL2 cells.

5. The method of claim 1, wherein the first type of ATM cells comprises AAL2 cells having an unspecified bit rate (UBR) and the second type of ATM cells comprises AAL2 cells have a bit rate type other than UBR.

6. The method of claim 1, wherein a given one of the AAL2 paths carries AAL2 cells having a same Quality of Service (QoS) requirement.

7. The method of claim 1, further comprising allocating more delay-sensitive traffic to a different AAL2 path than less delay-sensitive traffic.

8. The method of claim 1, further comprising providing differing treatment for differing AAL2 connections within the AAL2 path group based on the QoS requirements for the differing AAL2 connections.

9. The method of claim 1, further comprising providing a greater weighting or priority for more delay sensitive AAL2 connections.

10. A node of an Asynchronous Transfer Mode (ATM) comprising:
a plurality of ATM Adaptation Layer 2 (AAL2), paths which together form an AAL2 path group, the AAL2 path group comprising a first type of ATM cells from AAL2 paths with differing quality of service (QoS) classes, wherein a connection being admitted to one of the AAL2 paths of the AAL2 path group is based on available bandwidth of the AAL2 path group rather than available bandwidth of an individual AAL2 path;
a path group scheduler which selects ATM AAL2 cells from the plurality of AAL2 paths;
a non-path group ATM virtual circuit (VC) which includes ATM cells of a second type other than the ATM cells of the first type which comprise the AAL2 path group;
a scheduler which applies ATM cells of the path group and the non-path group ATM virtual circuit (VC) to an ATM virtual path (VP) for transmission to another node of the network.

11. The apparatus of claim 10, further comprising a connection admission controller unit which admits connections based on available bandwidth of the AAL2 path group rather than available bandwidth of an individual AAL2 path.

12. The apparatus of claim 10, wherein the first type of ATM cells comprises AAL2 traffic cells and the second type of ATM cells comprises cells dedicated to at least one of signaling, operation and maintenance, and synchronization.

13. The apparatus of claim 10, wherein the second type of ATM cells comprises cells which require a guaranteed bandwidth.

14. The apparatus of claim 10, wherein the first type of ATM cells comprises AAL2 cells and the second type of ATM cells comprises non-AAL2 cells.

15. The apparatus of claim 14, wherein the first type of ATM cells comprises AAL2 cells having an unspecified bit rate (UBR) and the second type of ATM cells comprises AAL2 cells have a bit rate type other than UBR.

16. The apparatus of claim 10, wherein a given one of the AAL2 paths carries AAL2 cells having a same Quality of Service (QoS) requirement.

17. The apparatus of claim 10, further comprising allocating more delay-sensitive traffic to a different AAL2 path than less delay-sensitive traffic.

18. The apparatus of claim 10, wherein the path group scheduler is a weighted fair queuing scheduler.

19. The apparatus of claim 10, wherein the path group scheduler is a strict priority scheduler.

20. The apparatus of claim 10, further comprising means for providing differing treatment for differing AAL2 connections within the AAL2 path group based on the QoS requirements for the differing AAL2 connections.

21. The apparatus of claim 20, further comprising means for providing a greater weighting or priority for more delay sensitive AAL2 connections.

22. An Asynchronous Transfer Mode (ATM) network comprising:
a first network node;
a second network node;
an ATM virtual path (VP) connecting the first network node and the second network node; wherein the first network node comprises:
a plurality of ATM Adaptation Layer 2 (AAL2), paths which together form an AAL2 path group, the AAL2 path group comprising a first type of ATM cells from AAL2 paths with differing quality of service (QoS) classes, wherein a connection being admitted to one of the AAL2 paths of the AAL2 path group is based on available bandwidth of the AAL2 path group rather than available bandwidth of an individual AAL2 path;
a path group scheduler which selects ATM AAL2 cells from the plurality of AAL2 paths;
a non-path group ATM virtual circuit (VC) which contains ATM cells of a second type other than ATM cells of the first type which comprise the AAL2 path group;
a scheduler which applies ATM cells of the path group and the non-path group ATM virtual circuit (VC) to the ATM virtual path (VP) for transmission to the second network node.

23. The apparatus of claim 22, further comprising a connection admission controller unit which admits connections based on available bandwidth of the AAL2 path group rather than available bandwidth of an individual AAL2 path.

24. The apparatus of claim 23, wherein the connection admission controller unit is situated at the first network node.

25. The apparatus of claim 23, wherein the connection admission controller unit is situated at the second network node.

26. The apparatus of claim 22, wherein the first type of ATM cells comprises AAL2 traffic cells and the second type of ATM cells comprises cells dedicated to at least one of signaling, operation and maintenance, and synchronization.

27. The apparatus of claim 22, wherein the second type of ATM cells comprises cells which require a guaranteed bandwidth.

28. The apparatus of claim 22, wherein the first type of ATM cells comprises AAL2 cells and the second type of ATM cells comprises non-AAL2 cells.

29. The apparatus of claim 22, wherein the first type of ATM cells comprises AAL2 cells having a first bit rate type and the second type of ATM cells comprises AAL2 cells having a second bit rate type.

30. The apparatus of claim 22, wherein a given one of the AAL2 paths carries AAL2 cells having a same Quality of Service (QoS) requirement.

31. The apparatus of claim 22, further comprising allocating more delay-sensitive traffic to a different AAL2 path than less delay-sensitive traffic.

32. The apparatus of claim 22, wherein one of the first network node and the second network node is a base station node.

33. The apparatus of claim 22, wherein the one of the first network node and the second network node is a radio network controller node.

34. The apparatus of claim 22, wherein the path group scheduler is a weighted fair queuing scheduler.

35. The apparatus of claim 22, wherein the path group scheduler is a strict priority scheduler.

36. The apparatus of claim 22, further comprising means for providing differing treatment for differing AAL2 connections within the AAL2 path group based on the QoS requirements for the differing AAL2 connections.

37. The apparatus of claim 36, further comprising means for providing a greater weighting or priority for more delay sensitive AAL2 connections.

38. Apparatus for managing traffic for transport on an Asynchronous Transfer Mode (ATM) virtual path (VP), the apparatus comprising:
   means for forming an ATM Adaptation Layer 2 (AAL2), path group which comprises plural AAL2 paths, the AAL2 path group comprising a first type of ATM cells from AAL2 paths with differing quality of service (QoS) classes;
   means for admitting connections based on available bandwidth of the AAL2 path group rather than available bandwidth of an individual AAL2 path;
   means for including, for transport on the virtual path (VP), ATM cells of a second type other than the first type of ATM cells which comprise the AAL2 path group.

39. The apparatus of claim 38, wherein the first type of ATM cells comprises AAL2 traffic cells and the second type of ATM cells comprises cells dedicated to at least one of signaling, operation and maintenance, and synchronization.

40. The apparatus of claim 38, wherein the second type of ATM cells comprises cells which require a guaranteed bandwidth.

41. The apparatus of claim 38, wherein the first type of ATM cells comprises AAL2 cells and the second type of ATM cells comprises non-AAL2 cells.

42. The apparatus of claim 38, wherein the first type of ATM cells comprises AAL2 cells having an unspecified bit rate (UBR) and the second type of ATM cells comprises AAL2 cells have a bit rate type other than UBR.

43. The apparatus of claim 38, wherein a given one of the AAL2 paths carries AAL2 cells having a same Quality of Service (QoS) requirement.

44. The apparatus of claim 38, further comprising allocating more delay-sensitive traffic to a different AAL2 path than less delay-sensitive traffic.

45. The apparatus of claim 38, further comprising means for providing differing treatment for differing AAL2 connections within the AAL2 path group based on the QoS requirements for the differing AAL2 connections.

46. The apparatus of claim 45, further comprising means for providing a greater weighting or priority for more delay sensitive AAL2 connections.

\* \* \* \* \*